April 24, 1962 C. W. MacMILLAN 3,030,796
AUTOMOBILE SHOCK ABSORBER TESTER
Filed Oct. 6, 1958 4 Sheets-Sheet 1
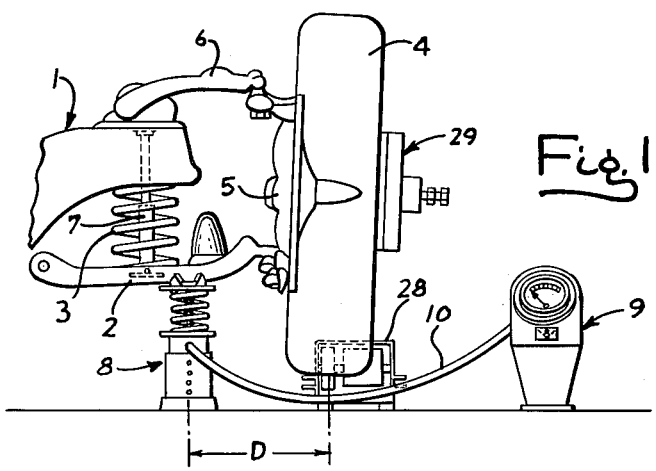
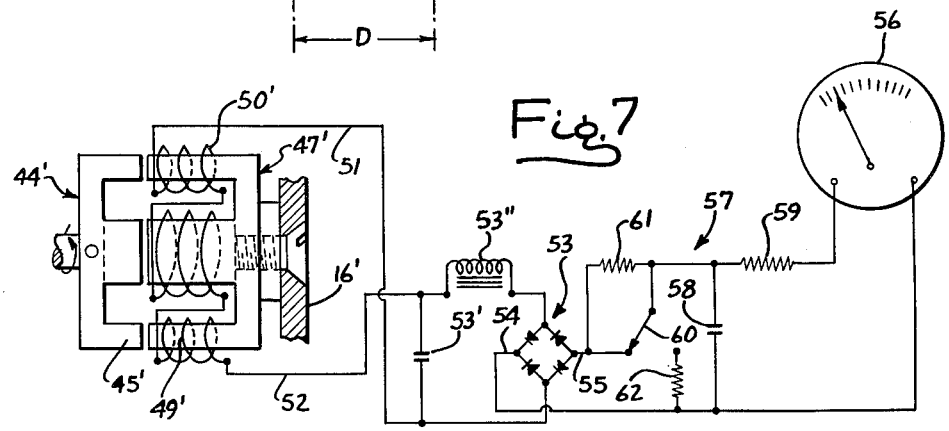
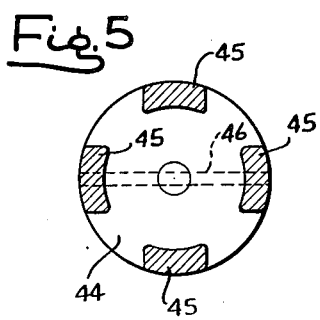
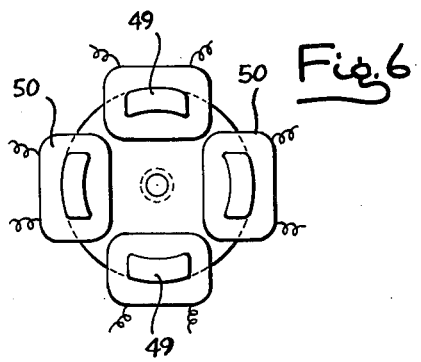
INVENTOR
CHARLES W. MACMILLAN
by: Gary, Desmond & Parker
ATTYS.

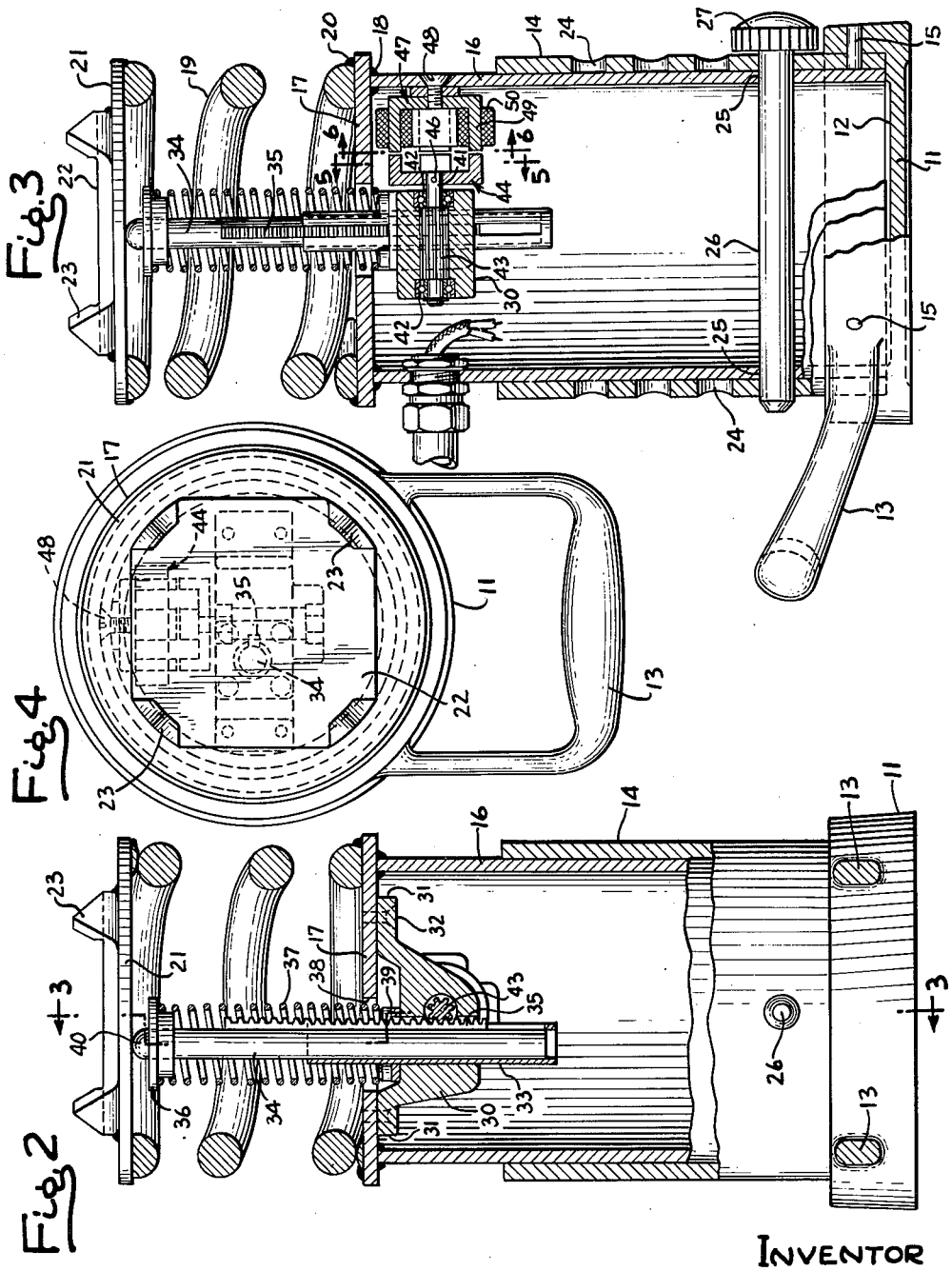

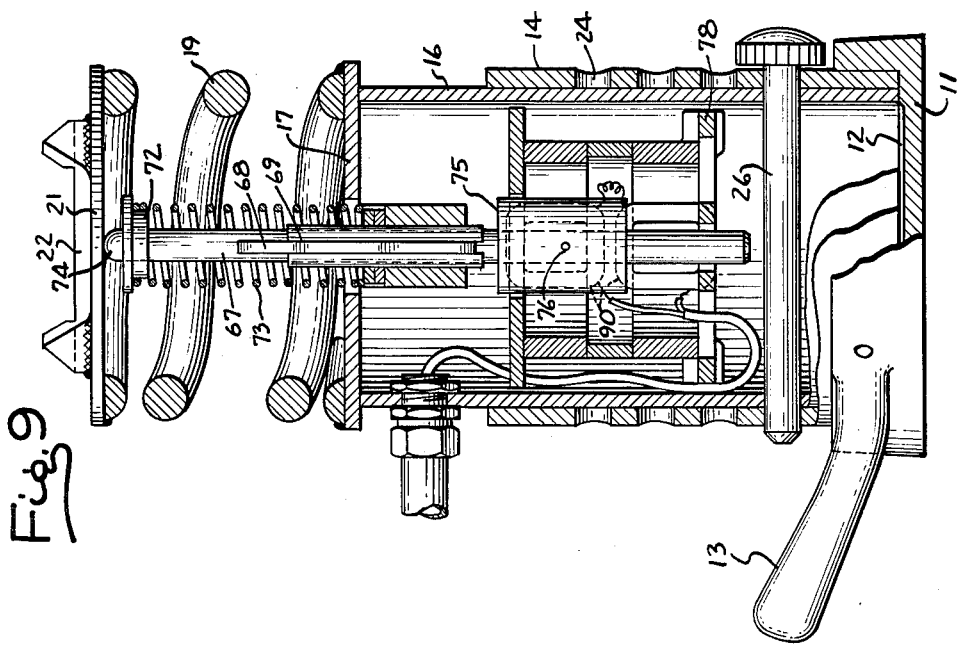
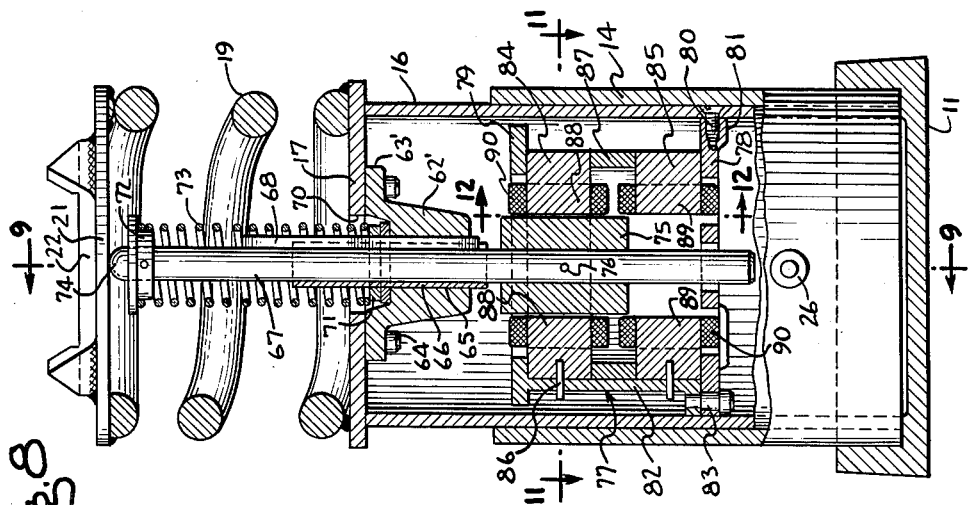

April 24, 1962 C. W. MacMILLAN 3,030,796
AUTOMOBILE SHOCK ABSORBER TESTER
Filed Oct. 6, 1958 4 Sheets-Sheet 4
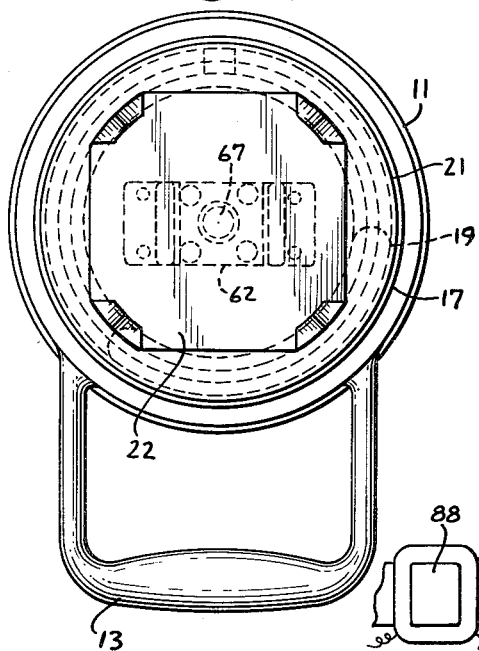
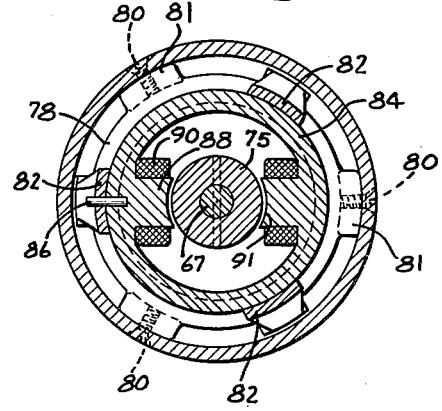
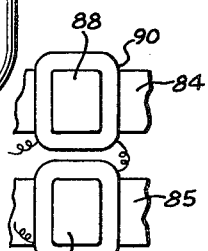
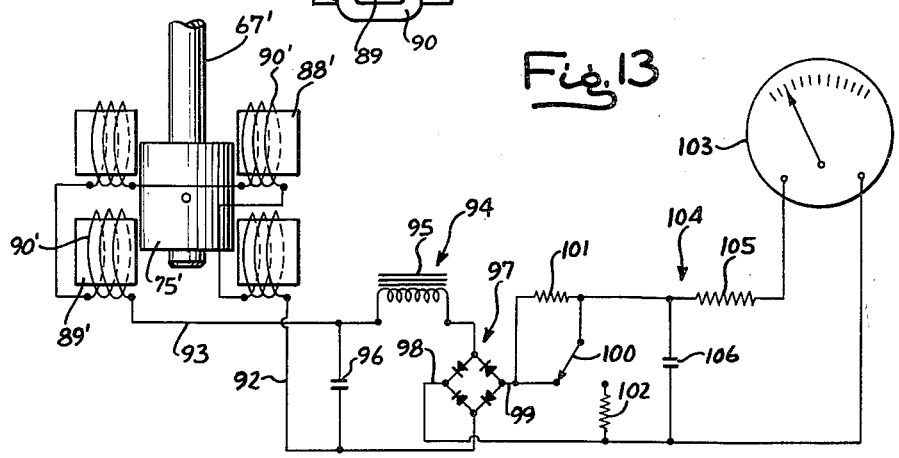
INVENTOR
CHARLES W. MACMILLAN
by: Gary, Desmond & Parker
ATTYS

United States Patent Office 3,030,796
Patented Apr. 24, 1962

3,030,796
AUTOMOBILE SHOCK ABSORBER TESTER
Charles W. MacMillan, Rock Island, Ill., assignor to Bear Manufacturing Company, Rock Island, Ill., a corporation of Delaware
Filed Oct. 6, 1958, Ser. No. 765,642
9 Claims. (Cl. 73—11)

This invention relates to improvements in shock absorber testers for automotive shock absorbers, and refers particularly to shock absorber testers which electrically indicate the condition of shock absorbers by the vibrational response of the unsprung portion of an automotive wheel assembly carrying a shock absorber occasioned by the rotation of an unbalanced wheel comprising a portion of the assembly.

In my copending application for United States patent Serial No. 745,151, filed June 27, 1958, now Patent No. 2,923,147, a shock absorber tester is shown and described of the type which mechanically converts vibration of the unsprung portion of an automotive wheel assembly carrying a shock absorber in response to the rotation of an unbalanced wheel comprising a portion of said assembly in terms of shock absorber condition.

The present invention accomplishes the same end result but secures said result by converting the vibrational response of the wheel assembly to an electrical impulse which is measured and is proportional to, or reflects the condition of the shock absorber carried by the wheel assembly.

The present invention comprises means for testing the condition of automobile shock absorbers which is economical to construct; is rugged; is extremely compact, and can be conveniently operated by a substantially untrained operator.

The objects and advantages of the present invention will be more apparent from the accompanying drawings and following detailed description.

In the drawings,

FIG. 1 is a detailed front elevational view of the shock absorber tester, embodying the features of the present invention, as applied to a front wheel assembly of an automobile.

FIG. 2 is an enlarged view, partially in section, of the sensing device comprising a portion of the invention.

FIG. 3 is a sectional view taken on line 3—3 of FIG. 2.

FIG. 4 is a top plan view of the device shown in FIG. 2.

FIG. 5 is an enlarged detailed sectional view taken on line 5—5 of FIG. 3.

FIG. 6 is an enlarged detailed sectional view taken on line 6—6 of FIG. 3.

FIG. 7 is a wiring diagram, partially schematic, of the electrical conversion elements employed.

FIG. 8 is a vertical sectional view of a modified form of the sensing device.

FIG. 9 is a sectional view taken on line 9—9 of FIG. 8.

FIG. 10 is a top plan view of the device illustrated in FIG. 8.

FIG. 11 is a detailed sectional view taken on line 11—11 of FIG. 8.

FIG. 12 is a detailed sectional view taken on line 12—12 of FIG. 8.

FIG. 13 is a wiring diagram, partially schematic, showing the modified electrical conversion elements employed in the modified form of the invention.

Referring in detail to the drawings, and with specific reference to FIG. 1 thereof, 1 indicates an end portion of the front frame of an automobile. A pivoted control arm 2 is secured to the frame 1 and between the frame portion and the control arm a coil spring 3 is positioned. A front wheel 4 is carried by bearing assembly 5 which is secured to the control arm 2 and an upper pivoted arm 6. A shock absorber 7 is positioned between the frame member 1 and the control arm 2.

The device comprising the present invention may also be used in testing the shock absorbers of the rear wheels of the automobile, and although the use of the device in conjunction with the rear wheels is not shown, it will be clear that the manner of testing is similar to the manner in which the front wheel shock absorbers are tested.

The device for testing the shock absorbers of the rear wheels or the shock absorbers 7 of the front wheels comprises generally a sensing device 8 and an indicating device 9, the sensing device being connected to the indicating device by an electric cable 10. When the device is employed to test the shock absorbers 7 associated with the front wheel assembly, the sensing device is disposed beneath the control arm 2 a distance D from the wheel 4. The distance D, particularly when testing the front shock absorbers, is important and comprises one of the calibration constants of the device and must closely conform to the remaining calibration constants of the device. In general, by spacing the device 8 closer to the wheel, the readings increase, while the readings decrease as the device 8 is moved further from the wheel. The distance D, when the rear shock absorbers are being tested, is not so critical, and in most cases an approximation of this distance is satisfactory. In testing the rear shock absorbers, the device 8 is normally positioned beneath the rear axle housing a distance approximating the distance D from the rear wheel.

The sensing device 8, shown enlarged in FIGS. 2, 3 and 4, comprises a foundation plate 11 having a depressed central portion 12 and a handle 13 whereby the device may be conveniently carried from place to place. An outer tubular member 14 is disposed with one end positioned in the depressed portion of the foundation plate and is secured thereto by screws 15. The upper end of the tubular member 14 is open. An inner tubular member 16 is telescopically positioned within the outer tubular member 14 and is axially movable relative thereto. A plate 17 is secured to the upper end of the inner tubular member 16 preferably by welding 18, or the like. A coil spring 19 is carried upon the upper face of the plate 17, the endmost coil of said spring being secured to the plate by welding 20, or the like. A second plate 21 is carried upon the uppermost coil of the spring 19 and is welded or otherwise secured to said coil. A support plate 22 is secured to the upper face of the plate 21, the support plate 22 being preferably rectangular in shape and having its corner portions bent upwardly, as shown best at 23 in FIGS. 2, 3 and 4.

The outer tubular member 14 is provided with a plurality of pairs of diametrically opposite vertically aligned openings 24 and the inner tubular member 16 is provided with a single pair of diametrically opposite openings 25.

In employing the device 8, it is positioned beneath the control arm 2 a distance D from wheel 4, or, if a rear shock absorber is to be tested, it is positioned beneath the rear axle housing a distance approximately equal to D from a rear wheel. The wheel is then jacked up in a conventional manner until the wheel can be rotated free of the ground. Depending upon the type of automobile, the inner tubular member may have to be telescopically moved upwardly until the support plate 22 contacts the control arm 2. When the inner tubular member has been so moved, a pin 26, having a knob 27 at one end thereof, may be inserted through a pair of holes 24 at a desired elevation, and through the pair of holes 25 in the inner member 16. The jack may then be removed and the arm 2 including the wheel assembly and corner portion of the automobile will then be supported by spring 19.

A resilient system is thus provided whose natural frequency of vibration is dependent upon spring 19, automobile spring 3, the damping effect of the shock absorber 7 and the weight of the assembly supported by spring 19. For predetermined spring suspension systems, a shock absorber having predetermined damping characteristics is considered optimum. Thus, assigning a constant value to the spring 3, the weight of the wheel assembly, and to spring 19, the device comprising the present invention is calibrated to determine the characteristics of the shock absorber 7. In addition to the constant factors enumerated hereinbefore, the distance D is also a constant factor, particularly with the front wheels, which must be observed to give a true range of characteristics of the shock absorber.

In order to employ the device comprising the present invention, after the assembly is supported upon the sensing device 8, the wheel 4 is rotated by a conventional wheel spinner 28. However, prior to spinning the wheel to make the shock absorber test, the wheel 4 is unbalanced to a known degree, which is also a constant factor which influences the calibration of the device.

To unbalance the wheel 4 to a known degree, the following procedure is followed: A conventional balance testing device 29, of the type which tests the balance of an automobile wheel without removing the wheel from the car, is mounted upon the wheel. The wheel is then tested for balance in the known manner. If the wheel is unbalanced, as in most cases it will be, the balancer is manipulated in the known manner to ascertain the location and degree of unbalance. Appropriate weights are then applied to the wheel at the appropriate places on the wheel to balance the wheel. If the wheel is initially found to be in balance, this latter step is unnecessary.

With the wheel balanced, the balance testing device may then be manipulated to unbalance the wheel to a desired, known degree. The wheel is then conditioned for the shock absorber test.

Of course, the present invention is not concerned with the specific manner in which the wheel is unbalanced to a known degree. However, by the use of a conventional balance testing device 29, the operator can be performed most conveniently.

With the wheel 4 properly unbalanced to a known degree, the wheel is then spun, by the device 28, to a speed which is above that at which the rotating unbalanced wheel and the resilient vibrational system are in resonance. The unbalanced wheel thereby imparts to the vibrational system a periodic vertical vibration, the maximum amplitude of which occurs when the wheel rotating at a predetermined speed is in resonance with the natural frequency of the vibrational system. In other words, at this period, the support plate 22 is displaced to a maximum degree.

A block 30, carrying flanges 31, is secured by screws 32 or the like, to the lower face of the plate 17. The block 30 is centrally apertured and carries a guide tube 33 therein, the tube extending above and below said plate. A follower rod 34 is slidably positioned within tube 33, said rod carrying a rack 35 upon a lateral side thereof. A collar 36 is secured by a pin or the like (not shown) to the upper end portion of the rod 34 and a coil spring 37 circumscribes the rod and bears at one end against the collar 36. The opposite end of spring 37 extends through an aperture 38 in plate 17 and bears upon a collar 39 which, in turn, rests upon block 30. The spring 37 is normally compressed and urges the upper rounded end 40 of the rod 34 into resilient contact with the bottom of plate 21.

Thus when plate 21 vibrates upwardly and downwardly and spring 19 unflexes and flexes in response to the impulses imparted by the unbalanced rotating wheel, the rod 34 moves axially within tube 33 as the rounded end 40 of said rod follows the movement of plate 21.

A shaft 41 is journaled in bearing assemblies 42 carried by block 30, said shaft carrying a pinion 43 which meshes with the teeth of rack 35. Thus, when rod 34 reciprocates the shaft 41 is oscillated. A disc-shaped permanent magnet 44, shown enlarged in FIG. 5, carries four poles 45, said magnet being secured to one end of shaft 41, by pin 46.

An electromagnetic assembly 47 is secured to the inner side of the wall of the inner tubular member 16 by means of screw 48, or the like, the assembly 47 carrying four cores 49 upon each of which a coil 50 is wound. The ends of poles 45 of the permanent magnet 44 are adapted to rotate in a plane disposed closely adjacent the plane of the end faces of the cores 49.

Referring particularly to FIG. 7, the permanent magnet 44 is indicated at 44' and the magnetic assembly 47 is indicated at 47', the coils 50 being indicated by the coils 50'. The coils 50' are connected in series and in such manner that rotation of the magnet 44' in a predetermined direction causes flux to thread said coils in an additive fashion producing a current in conductors 51 and 52 which is proportional to the angular movement of the magnet 44'. The conductors 51 and 52 are connected to a full wave rectifier 53 of the bridge type. Interposed between the coils 50' and rectifier 53 is a condenser 53' and inductance 53" which form a frequency correcting section of the circuit, the purpose of which will be hereinafter more fully described. The rectifier conductors 54 and 55 are connected to a galvanometer milliammeter through a filtering section 57 comprising condenser 58 and resistance 59. Interposed between the rectifier and filter is a double throw switch 60 and two resistors 61 and 62 for selecting a high or low scale on the meter 56. Preferably the low scale reading is substantially half of the high scale reading and the resistors 61 and 62 are selected accordingly.

The frequency correcting section comprising condenser 53' and inductance 53" eliminates the variation in oscillation frequencies at which readings may be taken. Thus if the resonant frequency, at which readings are taken, is different from vehicle to vehicle, this variation is eliminated and the device indicates amplitude only regardless of frequency within the operating ranges.

The arrangement is such that when magnet 44' swings in one direction, the change of flux threading coils 50' will produce a wave of current in one direction. A swing of the magnet in the opposite direction will produce a wave of current in the opposite direction. And so on, as the magnet oscillates. The currents so produced will be rectified by the full wave rectifier 53, filtered by the network 57 and, assuming that the oscillations of the magnet are sufficiently rapid, a substantially steady rate of current will be measured by the meter 56, the value of which will depend upon the angular displacements of the magnet 44'.

Thus, as plate 21 oscillates, due to the impulses imparted thereto by the rotation of the unbalanced wheel 4, a current will be indicated by meter 56. As the wheel passes through its resonant frequency, the swing of the meter needle will be a maximum and by suitable calibration this maximum swing may be interpreted as shock absorber condition.

Referring particularly to FIGS. 8 to 13 inclusive, another modification of the invention is shown. The frame of the sensing device used in this form of the invention is the same as has been hereinbefore described and without further detailed description similar reference numerals will be applied to similar parts of the frame of the modified device.

Referring particularly to FIGS. 8 and 9, a bearing member 62', carrying oppositely extending apertured lugs 63' is secured to the bottom side of plate 17 by means of screws 64 or the like. The member 62' is provided with a bore 65 in which a tubular guide sleeve 66 is immovably carried. A reciprocating rod 67 preferably constructed of a nonmagnetic stainless steel, is slidably positioned in the guide sleeve 66, said rod carrying a longitudinal rib 68 which registers with an elongated recess 69 provided in the sleeve 66. In operation the rod 67 reciprocates in sleeve 66 and during said motion, the engagement of the rib 68 in the recess 69 prevents rotary motion of the rod.

A relatively large aperture 70 is provided in plate 17 through which sleeve 66 and rod 67 extend. A collar 71 circumscribes sleeve 66 and rests upon the top of bearing 62'. A collar 72 is rigidly secured to the upper portion of rod 67 and a coil spring 73 circumscribing rod 67 is confined between collars 71 and 72. Thus, the upper end of rod 67, which is rounded, as shown best at 74 in FIGS. 8 and 9, is caused to resiliently contact the bottom of plate 21 and follow said plate during its oscillations. Beneath the bearing 62' and within the tubular member 16 a permanent magnet 75 of cylindrical shape is secured to the rod 67 by means of pin 76 or the like.

An aluminum core-holding frame 77 comprising an annular base ring 78 and an anular top ring 79 is secured to the wall of the tubular member 16 by means of screws 80 which extend through angularly spaced radial lugs 81. The upper ring 79 is connected to the base ring 78 by upright members 82 which are secured to the base ring by screws 83.

A pair of circular field cores 84 and 85 are secured in vertically spaced relationship of the core-holding frame 77 by pins 86, said field cores being separated by a non-magnetic spacer ring 87. Each field core 84 and 85 carries pairs of integral core pieces 88 and 89, respectively, upon each of which is carried a wire coil 90. The arrangement is such that the permanent magnet 75, during reciprocation of rod 67, moves vertically adjacent the core pieces 88 and 89, the faces of the core pieces being spaced from the magnet by a relatively narrow air gap 91.

In FIGS. 8 and 9, the sensing device is shown in its unloaded position, that is, no weight is applied to the plate 22. In normal loaded position, the magnet 75 will be approximately midway between the cores 88 and 89 as shown best at 75' in FIG. 13, and, during operation said magnet will oscillate about this substantially central position.

Referring particularly to FIG. 13, the schematic wiring diagram of the device is shown. As the vehicle wheel associated with the shock absorber to be tested is rotated, the rod 67', corresponding to rod 67, is vertically oscillated. Thus, the magnet 75' moves vertically adjacent the cores 88' and 89'. The coils 90' are connected in series and, hence, the current generated in said coils, by virtue of the variation of the threaded magnetic flux, is additive. The series-connected coils 90' are connected by conductors 92 and 93 to a frequency correcting section 94 comprising inductance 95 and condenser 96 and section 94 is, in turn, connected to a full wave rectifier 97. Conductors 98 and 99 are connected through a double throw switch 100 to put either resistor 101 or 102 in circuit, said resistors performing the same function as resistors 61 and 62, hereinbefore described. The rectifier 97 is connected to galvanometer or milliammeter 103 through filter section 104, comprising resistance 105 and condenser 106. The functioning of the circuit shown in FIG. 13 is generally the same as that of the circuit shown in FIG. 7.

By virtue of the rectifier 97 and the filter circuit 104, a unidirectional relatively smooth filtered current is measured by the meter 103, the current being proportional to the amplitude of vibration of the magnet 75'. Thus, by suitable calibration of the scale of meter 103, the condition of the shock absorber under test may be ascertained.

I claim as my invention:

1. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet connected to said rod and responsive in movement to the movement of said rod, a stationary electromagnetic assembly carried by said support adjacent the path of movement of said magnet, a frequency correcting circuit connected to said electromagnetic assembly and together with said electromagnetic assembly providing an electrical signal proportional to the length of the path of reciprocatory movement of said rod and independent of the rate of such movement, and an electric indicator connected to the electromagnetic assembly and frequency correcting circuit to measure said electrical signal.

2. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet connected to said rod and responsive in movement to the movement of said rod, a stationary electromagnetic assembly carried by said support, said assembly comprising a core upon which a coil of wire is carried, said core being disposed adjacent the path of movement of said magnet, a frequency correcting section connected to said coil, a rectifier connected to said frequency correcting section to rectify the current generated in said coil by the movement of said magnet relative to said core, and a direct current electric meter connected to said rectifier to measure said rectified current, said coil, frequency correcting section, and rectifier providing an electrical output to said meter proportional to the length of the path of movement of said rod and independent of the rate of said movement.

3. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet connected to said rod and responsive in movement to the movement of said rod, a stationary electromagnetic assembly carried by said support, said assembly comprising a core upon which a coil of wire is carried, said core being disposed adjacent the path of movement of said magnet, a frequency correcting section connected to said coil, a rectifier connected to said frequency correcting section to rectify the current generated in said coil by the movement of said magnet relative to said core, a filter circuit connected to said rectifier for damping the fluctuations of said rectified current, a direct current electric meter connected to said filter circuit to measure said rectified filter current said coil, frequency correcting section, rectifier, and filter circuit providing an electrical output to said meter proportional to the length of the path of movement of said rod and independent of the rate of said movement.

4. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a rack carried by said rod, a rotatable shaft carried by said support, a pinion carried by said shaft in mesh with said rack, a permanent magnet having spaced poles carried by said shaft, electromagnetic means carried by said support in inductive relationship to said magnet, a frequency correcting section connected to said electromagnetic means, a rectifier connected to said frequency correcting section for rectifying the current generated in said electromagnetic means, and a direct current electric meter connected to said rectifier to measure the rectified current passed through said rectifier, said electromagnetic means, frequency correcting section, and rectifier providing an electrical output to said meter proportional to the length of the path of movement of said rod and independent of the rate of said movement.

5. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a rack carried by said rod, a rotatable shaft carried by said support, a pinion carried by said shaft in mesh with said rack, a permanent magnet having annularly spaced poles carried by said shaft, electromagnetic means carried by said support in inductive relationship to said magnet, said electromagnetic means comprising a plurality of angularly spaced ferromagnetic cores and a wire coil carried by each core, a frequency correcting section connected to said coils, a full wave rectifier connected to said frequency correcting section, a filter circuit connected to said rectifier, and a direct current electric meter connected to said filter circuit to measure the rectified, filtered current, said coils, frequency correcting section, rectifier, and filter providing an electrical output to said meter proportional to the length of the path of movement of said rod and independent of the rate of said movement.

6. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet carried by said rod and movable therewith, a frame carried by said support, electromagnetic means carried by said frame, said electromagnetic means comprising a plurality of ferromagnetic cores carried by said frame laterally adjacent the path of reciprocating movement of said magnet, a coil carried by each core, a frequency correcting section connected to said coils, said coils and frequency correcting section providing an electrical output proportional to the length of the path of movement of said rod and independent of the rate of said movement, and an electric meter connected to said coils and the frequency correcting section to measure said electrical output.

7. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet carried by said rod and movable therewith, a frame carried by said support, electromagnetic means carried by said frame, said electromagnetic means comprising a plurality of ferromagnetic cores carried by said frame laterally adjacent the path of reciprocating movement of said magnet, a coil carried by each core, said coils being connected in series, a frequency correcting section connected to said coils, said coils and frequency correcting section providing an electrical output proportional to the length of the path of movement of said rod and independent of the rate of said movement, and an electric meter connected to said coils and the frequency correcting section to measure said electrical output.

8. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet carried by said rod and movable therewith, a frame carried by said support, electromagnetic means carried by said frame, said electromagnetic means comprising a pair of ferromagnetic field cores, said cores being superimposed relative to the length of said rod, a pair of opposite pole pieces carried by each field core, a coil carried by each pole piece, said pole pieces being disposed laterally adjacent the reciprocating path of travel of said magnet, said coils being connected in series, a frequency correcting section connected to said coils, said coils and frequency correcting section providing an electrical output proportional to the length of the path of movement of said rod and independent of the rate of said movement, and meter means connected to said frequency correcting section to measure the current generated in said coils in response to the movement of said magnet and independent of the rate of said movement.

9. A shock absorber tester for testing the effectiveness of an automobile shock absorber interposed between the frame of the automobile and the unsprung wheel assembly thereof in response to the oscillating impulse imparted to the unsprung wheel assembly by the rotation of an unbalanced wheel comprising said wheel assembly, said shock absorber tester comprising a support, a coil spring carried by said support, a plate carried by said coil spring upon which the unsprung wheel assembly of the automobile is adapted to rest and which responds to the oscillations imparted by the unsprung wheel assembly, a rod slidably carried by said support, means for holding an end of said rod in following contact with said plate whereby said rod reciprocates in timed relationship with the movement of said plate, a permanent magnet connected to said rod and responsive in movement to the movement of said rod, a stationary electromagnetic assembly carried by said support, said assembly comprising a core upon which a coil of wire is carried, said core being disposed adjacent the path of movement of said magnet whereby an alternating current is generated in said coil, an electric circuit connecting said coil to a direct current electric meter to measure the amplitude of vibration of said rod in terms of current, said circuit comprising a frequency correcting network for substantially eliminating frequency of vibration of the rod as a factor determining the current amplitude measurement, a rectifier, and a filter network.

References Cited in the file of this patent

UNITED STATES PATENTS

| | | |
|---|---|---|
| 2,340,609 | Mestas | Feb. 1, 1944 |
| 2,363,373 | Werner | Nov. 21, 1944 |
| 2,445,682 | Macgeorge | July 20, 1948 |
| 2,764,019 | Lindholm et al. | Sept. 25, 1956 |
| 2,842,688 | Martin | July 8, 1958 |
| 2,923,147 | MacMillan | Feb. 2, 1960 |

FOREIGN PATENTS

| | | |
|---|---|---|
| 1,013,094 | Germany | Aug. 1, 1957 |
| 784,652 | Great Britain | Oct. 16, 1957 |